(12) United States Patent
Clemm et al.

(10) Patent No.: US 8,996,982 B2
(45) Date of Patent: Mar. 31, 2015

(54) MANAGING REQUIREMENTS PLANNING IN A COLLABORATIVE COMPUTING ENVIRONMENT

(75) Inventors: Geoffrey M. Clemm, Concord, MA (US); Muhtar B. Akbulut, Boston, MA (US); Aamer Khan, Arlington, MA (US); Sean P. Cudmore, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 1296 days.

(21) Appl. No.: 11/616,571

(22) Filed: Dec. 27, 2006

(65) Prior Publication Data

US 2008/0163072 A1 Jul. 3, 2008

(51) Int. Cl.
*G06F 15/00* (2006.01)
*G06F 9/44* (2006.01)
*G06Q 10/10* (2012.01)

(52) U.S. Cl.
CPC . *G06F 8/10* (2013.01); *G06Q 10/10* (2013.01)
USPC .......................................... 715/229; 715/230

(58) Field of Classification Search
USPC .................. 715/200, 229, 230, 231, 273, 255
See application file for complete search history.

(56) References Cited

U.S. PATENT DOCUMENTS

| | | | |
|---|---|---|---|
| 5,311,424 A | 5/1994 | Mukherjee et al. | |
| 6,473,794 B1 * | 10/2002 | Guheen et al. | 709/223 |
| 6,526,567 B1 | 2/2003 | Cobbett et al. | |
| 6,615,253 B1 | 9/2003 | Bowman-Amuah | |
| 6,983,221 B2 | 1/2006 | Tracy et al. | |
| 7,167,844 B1 * | 1/2007 | Leong et al. | 705/80 |
| 2001/0052108 A1 * | 12/2001 | Bowman-Amuah | 717/1 |
| 2003/0058277 A1 * | 3/2003 | Bowman-Amuah | 345/765 |
| 2004/0230886 A1 * | 11/2004 | Livshits | 715/500 |
| 2006/0123033 A1 * | 6/2006 | Livshits | 707/101 |
| 2006/0168182 A1 * | 7/2006 | Fuller et al. | 709/223 |
| 2006/0168183 A1 * | 7/2006 | Fuller et al. | 709/223 |
| 2006/0168558 A1 * | 7/2006 | de Seabra e Melo et al. | 717/105 |
| 2008/0127089 A1 * | 5/2008 | Peretz et al. | 717/122 |

* cited by examiner

*Primary Examiner* — Stephen Hong
*Assistant Examiner* — Gregory J Vaughn
(74) *Attorney, Agent, or Firm* — Steven M. Greenberg, Esq.; CRGO Law

(57) ABSTRACT

Embodiments of the present invention provide a method, system and computer program product for managing requirements planning in a collaborative computing environment. In one embodiment of the invention, a requirements planning management method can include identifying each approving stakeholder for a version of a requirement in a requirements plan, creating traceability links between each approving stakeholder and the version of the requirement, and notifying each approving stakeholder having a traceability link to the version of the requirement whenever a new version of the requirement is proposed by a stakeholder. The method also can include merging multiple versions of the requirement into a single document, displaying the single document to a viewing stakeholder, and marking up the single document to reflect differences between the single document and a most recent version of the requirement for the viewing stakeholder.

20 Claims, 2 Drawing Sheets

MANAGING REQUIREMENTS PLANNING IN A COLLABORATIVE COMPUTING ENVIRONMENT

BACKGROUND OF THE INVENTION

1. Field of the Invention

The present invention relates to the field of requirements planning and more particularly to automated management of collaborative requirements planning.

2. Description of the Related Art

Requirements planning relates to the planning of requirements for a software system. Generally, the "requirements" for a software system refer to a set of artifacts such as files, records in a database and the like that define the software system in a form understood both by the consumers including the end-users and purchasing decision-makers, and the producers including the business analysts, architects, and developers of the software system. The process of specifying the requirements for a software system ensures that the consumers and producers both understand and agree on the requirements for the software system.

Traditionally, in the requirements planning process, either the consumers or the producers propose an initial set of requirements. Thereafter, the stakeholders to the requirements plan—namely, both the consumer and the producers—can convene to discuss the initially proposed requirements. The convention ultimately results in the production of a new version of requirements and the stakeholders can cycle through multiple different conventions until a version of the requirements plan has been approved by all stakeholders.

Notably, the understanding of what is desirable for the consumers in terms of requirements, and what is feasible for the producers in terms of meeting the requirements continually changes during the development of a software system. In order to satisfy the requirements of consumers with a deliverable, the requirements changes must be understood and approved by all the stakeholders. Consequently, the requirements management process must actively continue throughout the software development process.

Recognizing the fluid nature of requirements planning, the modern Extreme Programming (XP) development process mandates the gathering of all stakeholders (including consumers with approval responsibilities) into a single physical location for the lifetime of the software project. In an XP modeled development process, stakeholders continuously meet and have discussions as a group during the development cycle. The XP development process, however, cannot account for distributed development where the stakeholders cannot gather into a single physical location due to either a large number of stakeholders or the geographic distribution of the stakeholders. Additionally, the XP development process cannot account for an expanding stakeholder membership where new stakeholders lack the context of previous discussions collaboration.

BRIEF SUMMARY OF THE INVENTION

Embodiments of the present invention address deficiencies of the art in respect to requirements planning and provide a novel and non-obvious method, system and computer program product for managing requirements planning in a collaborative computing environment. In one embodiment of the invention, a requirements planning management method can be provided. The method can include identifying each approving stakeholder for a version of a requirement in a requirements plan, creating traceability links between each approving stakeholder and the version of the requirement, and notifying each approving stakeholder having a traceability link to the version of the requirement whenever a new version of the requirement is proposed by a stakeholder. The method also can include merging multiple versions of the requirement into a single document, displaying the single document to a viewing stakeholder, and marking up the single document to reflect differences between the single document and a most recent version of the requirement for the viewing stakeholder.

In one aspect of the embodiment, the method can include applying annotations to the requirement, displaying the annotations in the single document in association with corresponding sections of the requirement, and highlighting selected ones of the annotations that have been either added, removed, or changed since a most recent viewing of the requirement by the viewing stakeholder. In another aspect of the embodiment, the method can include applying an annotation to the version of the requirement, associating the annotation with a range of versions of the requirement, and filtering a display of the annotation in association with the displaying of the single document according to the range of versions of the requirement. Finally, in yet another aspect of the embodiment, the method can include applying a question type annotation to the version of the requirement, identifying a stakeholder responsible for creating the version of the requirement, and notifying the identified stakeholder of the question to solicit a comment type annotation by the identified stakeholder as a response to the question type annotation.

In another embodiment of the invention, a requirements planning data processing system can be provided. The system can include a requirements planning system configured to maintain traceability links between a version of a requirement in a requirement plan and different stakeholders approving of the version of the requirement, and an annotation manager coupled to an annotation data store. The annotation manager can include program code enabled to accept an annotation description for a version of a requirement and to store in association with the annotation description a scope for the annotation in respect to different versions of the requirement. In this regard, the annotation description can include a comment, an objection or a question. Additionally, the scope for the annotation can include a version start and a version end.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing requirements planning in a collaborative computing environment. In accordance with an embodiment of the present invention, the requirements management process can be modeled as a distributed authoring process. In this regard, version-aware traceability links to different requirements in a requirements plan can be established for different stakeholders to indicate required approval by the different stakeholders. Each traceability link can track different approval status values for different versions of a corresponding requirement. Additionally, information from the traceability links can be used to filter and annotate corresponding requirements as well as to trigger notifications to the stakeholders.

Figure 1:
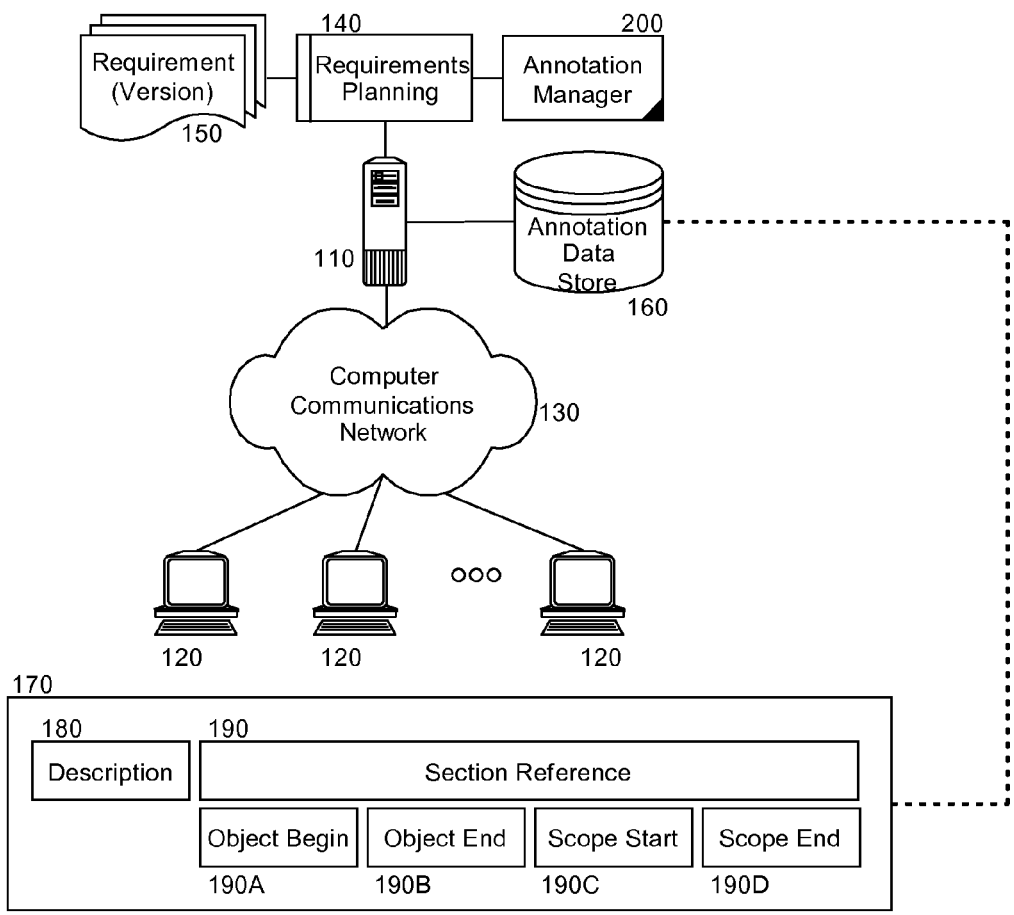
FIG. 1 is a schematic illustration of a collaborative computing data processing system configured for requirements planning management.

In further illustration, FIG. 1 is a schematic illustration of a collaborative computing data processing system configured for requirements planning management. The system can include a host computing platform 110 configured for communicative coupling to one or more collaborative clients 120 over a computer communications network 130. The host computing platform 110 can support the operation of a requirements planning system 140. The requirements planning system 140 can be configured to support the establishment of requirements 150 for a requirement plan.

Notably, the requirements 150 can be classified according to revision version such that a current view of a requirements plan will include the most recent version of defined requirements in the plan. Each of the requirements 150 further can be associated with one or more stakeholders such that the requirements plan, itself will become finalized when each of the requirements 150 becomes approved by all stakeholders for the requirements 150. Prior to approval of any given one of the requirements 150, the requirements 150 individually can be annotated according to an annotation manager 200 and the annotations can be stored within the annotation data store 160.

Three forms of annotations can be provided: comments, questions, and objections. An objection is an indication that there is a problem with the requirement, and that the stakeholder making the objection will not approve the requirement unless changes are made to address that objection (or the stakeholder can be convinced to withdraw the objection). A question is an indication that this stakeholder needs additional information about the requirement, but unlike an objection, a question does not mean that the stakeholder objects to anything currently stated in the requirement. When a question is created, the stakeholder that created the version referenced by the question is notified. A comment contains additional information about the requirement, but this information is not a substantive change that requires review by the other stakeholders. An annotation can also be placed on another annotation, such as when a stakeholder has a question about a comment, or has a comment about an objection.

As shown in FIG. 1, an annotation 170 can include a textual description field 180 and a reference 190 to a section of the requirement to which the annotation 170 logically applies. The reference 190 identifies a pair of locations within the section, namely the beginning of the section 190A and end of the section 190B. The reference also contains a scope indicator, including a start-version 190C and an end-version 190D. The start-version 190C indicates the first version to which that annotation 170 applies, and is the requirement version that is current when the annotation 170 is created. The end-version 190D is the first version to which that annotation 170 no longer applies, and is the requirement version that is current when a stakeholder that has permission to modify the annotation 170 executes a "remove" operation on the annotation.

To avoid the lengthy delays that result from a sequential review process, all stakeholders are allowed to annotate and revise requirements in parallel. To avoid every stakeholder having to separately review each revision of each requirement, a stakeholder will only review the latest revision at the time of their review. If there are multiple revisions that were performed in parallel, these revisions are presented to the stakeholder in a merged format that makes it easy for the stakeholder to compare the changes made by the respective revisions. When the stakeholder is reviewing multiple revisions, the stakeholder may accept one or more of those revisions, or he may merge those revisions into a single new revision, and accept the resulting new merged revision.

Figure 2:
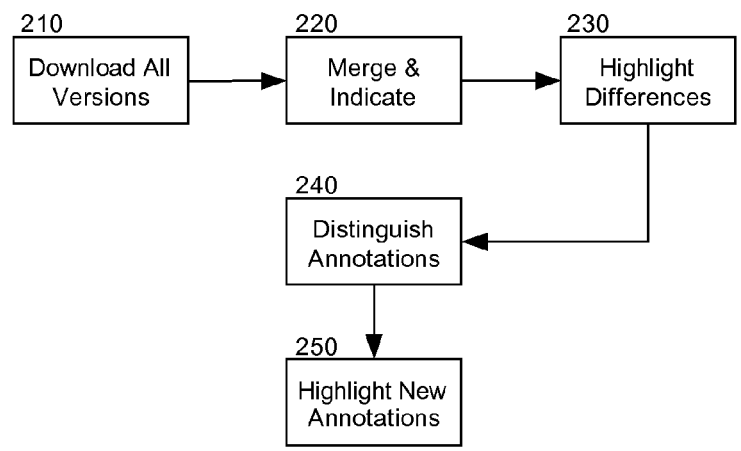
FIG. 2 is a flow chart illustrating a process for managing requirements planning in a collaborative computing environment; and, FIG. 3 is a flow chart illustrating a process for managing requirements planning for selected requirements in a requirement plan.

Specifically, FIG. 2 is a flow chart illustrating a process for displaying managed requirements in a requirements plan in a collaborative computing environment. Beginning in block 210, all versions of a requirement can be retrieved that do not have a predecessor. In block 220, all versions of the requirement can be merged into a single document, with markup indicating the source sections for each of the versions of the requirement. In block 230, the differences between the single document and the most recent version of the requirement approved by a current viewer of the single document can be highlighted. Also, in block 240, annotations for the requirement within scope can be displayed by reference to a corresponding section of the document. Finally, in block 250, all newly added, removed and changed annotations since a most recent review can be highlighted.

Notably, each requirement in a requirement plan can be processed collaboratively across different versions, complete with collaboratively applied annotations, until all stakeholders linked to the requirement provide approval for the requirement. Stakeholders approving each requirement can be linked to the requirement by way of a traceability link. The traceability link further can be used to determine which stakeholders are to be notified when an annotation is applied to a version of a requirement, and when a new version of a requirement is provided which has not yet been approved by the stakeholder.

Figure 3:
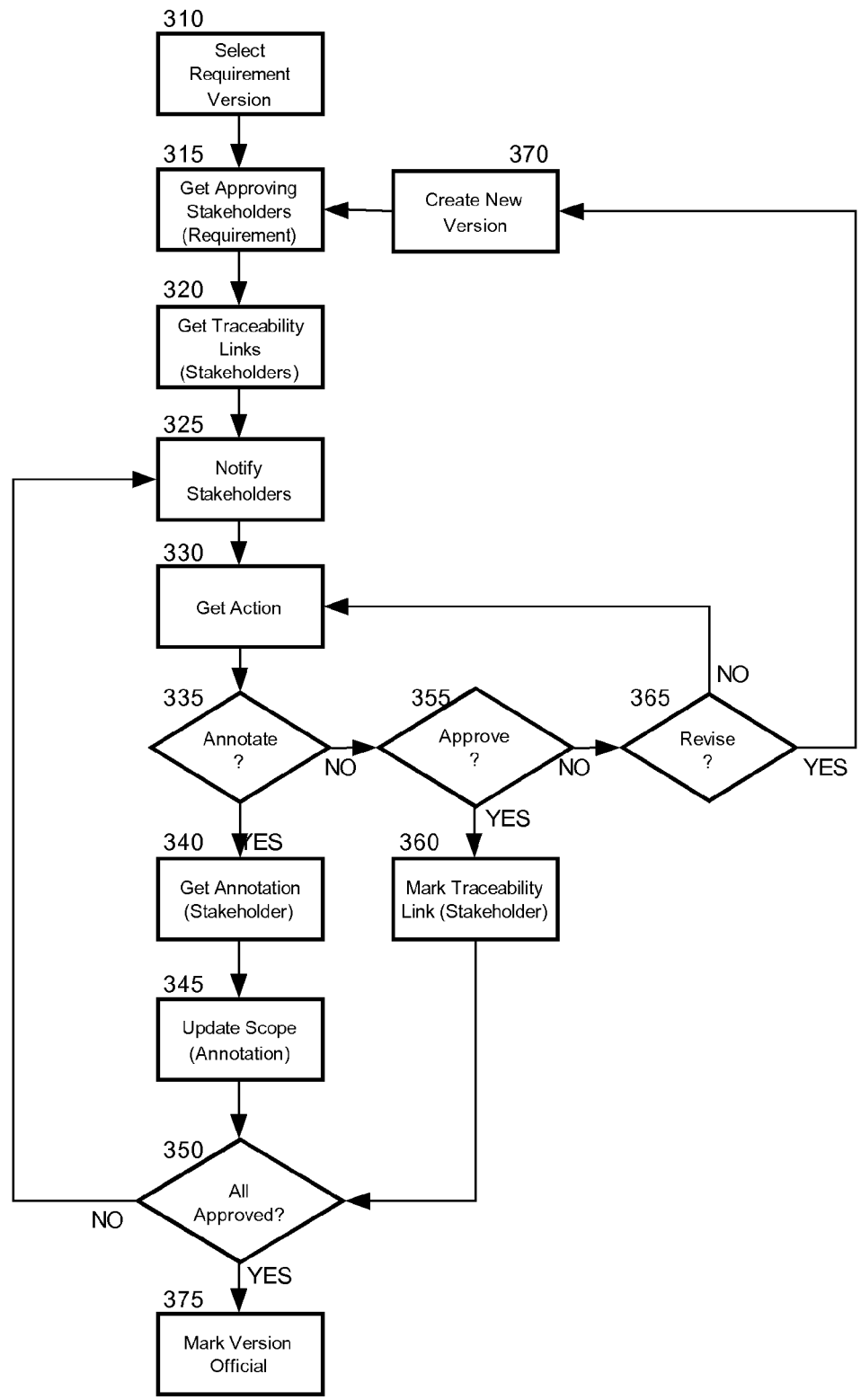

In illustration, as shown in FIG. 3, beginning in block 310, a requirement version can be selected for processing. In block 315 the stakeholders for the requirement version can be determined and in block 320, traceability links between each approving stakeholder and the requirement version can be retrieved. In block 325, the stakeholders referenced by the traceability links can be notified that a new requirement version has not yet been approved by the stakeholders. Thereafter, in block 330, actions can be applied by the stakeholders.

For instance, in decision block 335, it can be determined if a stakeholder intends to annotate the requirement version. If so, in block 340 the annotation from the stakeholder can be received and applied to a designated section of the requirement version. In block 345, the scope of the annotation can be updated to reference the applicable requirements version. Thereafter, in decision block 350 if all stakeholders have approved of the requirements version, the version can be marked official in block 375. Otherwise, the process can repeat in block 325 where all stakeholders can be notified that a version of the requirement has not yet been approved. Subsequently, in block 330, actions can be applied by the stakeholders in respect to the requirement version.

For example, in decision block 355, it can be determined if a stakeholder approves of the selected requirement version. If so, in block 360 a traceability link can be established between the stakeholder and the approved requirement version. Thereafter, in decision block 350 if all stakeholders have approved of the requirements version, the version can be marked official in block 375. Otherwise, the process can repeat in block 325 where all stakeholders can be notified that a version of the requirement has not yet been approved. Subsequently, in block 330, actions can be applied by the stakeholders in respect to the requirement version.

Finally, in decision block 365, it can be determined if a stakeholder intends to revise the selected requirement version. If so, in block 370 a new version of the requirement can be created. Thereafter, in block 315 the approving stakeholders of the previous requirement version can be retrieved and the traceability links for those stakeholders can be retrieved. In block 325 the stakeholders can be notified that a version of the requirement has not yet been approved. Subsequently, in block 330, actions can be applied by the stakeholders in respect to the requirement version. Notably, only when all stakeholders for a requirement have approved a requirement version will the version be marked official in block 375.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain, store or communicate the program for use by or in connection with the instruction execution system, apparatus, or device. The medium can be an electronic, magnetic, optical, electromagnetic, or semiconductor system (or apparatus or device).

Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A requirements planning management method comprising:
   identifying in a requirements planning system executing in memory of a host computing platform, each approving stakeholder for a version of a requirement in a requirements plan of requirements for a software system;
   creating traceability links between each approving stakeholder and the version of the requirement, each traceability link connecting a stakeholder with a specific version of the requirement requiring the approval of the stakeholder and tracking different approval status values for different versions of a corresponding requirement;
   notifying each approving stakeholder having the traceability link to the version of the requirement whenever a new version of the requirement is proposed by the stakeholder;
   merging all versions of the requirement into a single document for displaying the single document to a viewing approving stakeholder; and
   marking up the single document to reflect differences between the single document and a most recent version of the requirement approved by the viewing approving stakeholder.

2. The method of claim 1, further comprising:
   applying a plurality of annotations to the requirement;
   displaying the annotations in the single document in association with corresponding sections of the requirement; and,
   highlighting selected ones of the annotations that have been either added, removed, or changed since a most recent viewing of the requirement by the viewing stakeholder.

3. The method of claim 2, wherein the plurality of annotations includes a textual description field and a reference to a section of the requirement to which the annotation logically applies, the reference identifying a pair of locations and also a scope indicator.

4. The method of claim 2, wherein the plurality of annotations includes one of a comment, an objection, and a question.

5. The method of claim 1, further comprising:
   applying an annotation to the version of the requirement;
   associating the annotation with a range of versions of the requirement; and,
   filtering a display of the annotation in association with the displaying of the single document according to the range of versions of the requirement.

6. The method of claim 1, further comprising:
   applying a question type annotation to the version of the requirement;
   identifying a stakeholder responsible for creating the version of the requirement; and,
   notifying the identified stakeholder of the question to solicit a comment type annotation by the identified stakeholder as a response to the question type annotation.

7. The method of claim 1, further comprising marking up the single document to indicate a source version of the requirement for each section in the single document.

8. The method of claim 1, further comprising displaying the marked up single document to the viewing approving stakeholder.

9. A requirements planning data processing system comprising:

a requirements planning system executing in memory by at least one processor of a host computing platform and configured to maintain traceability links between a version of a requirement in a requirement plan of requirements for a software system and different stakeholders approving of the version of the requirement, each traceability link connecting a stakeholder with a specific version of the requirement requiring the approval of the stakeholder and tracking different approval status values for different versions of a corresponding requirement;

an annotation manager coupled to an annotation data store, the annotation manager comprising program code enabled to accept an annotation for a version of a requirement and to store the annotation within the annotation data store; and a displayer for displaying a single document merged from all versions of the requirement to a viewing approving stakeholder, wherein the single document is marked to reflect differences between the single document and a most recent version of the requirement approved by the viewing approving stakeholder.

10. The system of claim 9, wherein the annotation includes one of a comment, an objection, and a question.

11. The system of claim 9, wherein the single document is further marked to indicate a source version of the requirement for each section in the single document.

12. The system of claim 9, wherein the annotation includes a textual description field and a reference to a section of the requirement to which the annotation logically applies, the reference identifying a pair of locations and also a scope indicator.

13. A computer program product comprising a non-transitory computer usable storage medium embodying computer usable program code for requirements planning management, the computer program product comprising:

computer usable program code for identifying each approving stakeholder for a version of a requirement in a requirements plan of requirements for a software system;

computer usable program code for creating traceability links between each approving stakeholder and the version of the requirement, each traceability link connecting a stakeholder with a specific version of the requirement requiring the approval of the stakeholder and tracking different approval status values for different versions of a corresponding requirement;

computer usable program code for notifying each approving stakeholder having the traceability link to the version of the requirement whenever a new version of the requirement is proposed by the stakeholder;

computer usable program code for merging all versions of the requirement into a single document for displaying the single document to a viewing approving stakeholder; and computer usable program code for marking up the single document to reflect differences between the single document and a most recent version of the requirement approved by the viewing approving stakeholder.

14. The computer program product of claim 13, further comprising:

computer usable program code for applying a plurality of annotations to the requirement;

computer usable program code for displaying the annotations in the single document in association with corresponding sections of the requirement; and, computer usable program code for highlighting selected ones of the annotations that have been either added, removed, or changed since a most recent viewing of the requirement by the viewing stakeholder.

15. The computer program product of claim 14, wherein the plurality of annotations includes a textual description field and a reference to a section of the requirement to which the annotation logically applies, the reference identifying a pair of locations and also a scope indicator.

16. The computer program product of claim 14, wherein the plurality of annotations includes one of a comment, an objection, and a question.

17. The computer program product of claim 13, further comprising:

computer usable program code for applying an annotation to the version of the requirement;

computer usable program code for associating the annotation with a range of versions of the requirement; and, computer usable program code for filtering a display of the annotation in association with the displaying of the single document according to the range of versions of the requirement.

18. The computer program product of claim 13, further comprising:

computer usable program code for applying a question type annotation to the version of the requirement;

computer usable program code for identifying a stakeholder responsible for creating the version of the requirement; and, computer usable program code for notifying the identified stakeholder of the question to solicit a comment type annotation by the identified stakeholder as a response to the question type annotation.

19. The computer program product of claim 13, further comprising computer usable program code for marking up the single document to indicate a source version of the requirement for each section in the single document.

20. The computer program product of claim 13, further comprising computer usable program code for displaying the marked up single document to the viewing approving stakeholder.

* * * * *